(12) United States Patent
Lam et al.

(10) Patent No.: US 10,652,278 B2
(45) Date of Patent: May 12, 2020

(54) COMPLIANCE MONITORING

(71) Applicant: FORESCOUT TECHNOLOGIES, INC., San Jose, CA (US)

(72) Inventors: Anderson Lam, Fremont, CA (US); Kevin Benjamin Mayer, Tel Aviv (IL); Yuri Mikhel, Los Gatos, CA (US); Gilad Walden, Tel-Aviv (IL)

(73) Assignee: Forescout Technologies, Inc., San Jose, CA (US)

( * ) Notice: Subject to any disclaimer, the term of this patent is extended or adjusted under 35 U.S.C. 154(b) by 172 days.

(21) Appl. No.: 15/383,137

(22) Filed: Dec. 19, 2016

(65) Prior Publication Data

US 2018/0176254 A1 Jun. 21, 2018

(51) Int. Cl.
H04L 29/06 (2006.01)

(52) U.S. Cl.
CPC ............ *H04L 63/20* (2013.01); *H04L 63/102* (2013.01); *H04L 63/105* (2013.01); *H04L 63/1408* (2013.01); *H04L 63/1433* (2013.01); *H04L 63/1441* (2013.01)

(58) Field of Classification Search
CPC ....... H04L 63/20; H04L 63/02; H04L 63/102; H04L 63/105; H04L 63/1408; H04L 63/1433; H04L 63/1441
See application file for complete search history.

(56) References Cited

U.S. PATENT DOCUMENTS

| | | | | |
|---|---|---|---|---|
| 8,495,700 | B2 * | 7/2013 | Shahbazi | H04L 63/20 380/247 |
| 8,874,685 | B1 * | 10/2014 | Hollis | H04L 41/00 709/206 |
| 2007/0124803 | A1 * | 5/2007 | Taraz | G06F 21/577 726/4 |
| 2010/0333168 | A1 * | 12/2010 | Herrod | H04L 41/0813 726/1 |
| 2013/0117847 | A1 * | 5/2013 | Friedman | H04L 63/102 726/22 |
| 2015/0215332 | A1 * | 7/2015 | Curcic | H04L 63/1433 726/25 |
| 2015/0326601 | A1 * | 11/2015 | Grondin | G06F 16/24578 726/25 |
| 2016/0197962 | A1 * | 7/2016 | Winn | H04L 63/20 713/168 |
| 2018/0176262 | A1 * | 6/2018 | Kavi | H04L 63/205 |

OTHER PUBLICATIONS

Int'l Search Report and Written Opinion of the ISA/EP in PCT/US2017/063797 dated Feb. 23, 2018; 14 pgs.

* cited by examiner

*Primary Examiner* — Kambiz Zand
*Assistant Examiner* — Alexander R Lapian
(74) *Attorney, Agent, or Firm* — Womble Bond Dickinson (US) LLP; Daniel E. Ovanezian

(57) ABSTRACT

Systems, methods, and related technologies for device compliance monitoring are described. In certain aspects, one or more compliance rules associated with a device classification are used to determine a compliance level of a device. The one or more compliance rules may be based on a standard. An action can be initiated based on the compliance level.

18 Claims, 4 Drawing Sheets

COMPLIANCE MONITORING

TECHNICAL FIELD

Aspects and implementations of the present disclosure relate to network monitoring, and more specifically, to checking device compliance and remediation of device compliance issues.

BACKGROUND

As technology advances, the number and variety of devices that are connected to communications networks are rapidly increasing. Each device may have its own respective vulnerabilities which may leave the network open to compromise or other risks. Understanding the vulnerabilities on each device on a network can be useful for monitoring or securing the communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
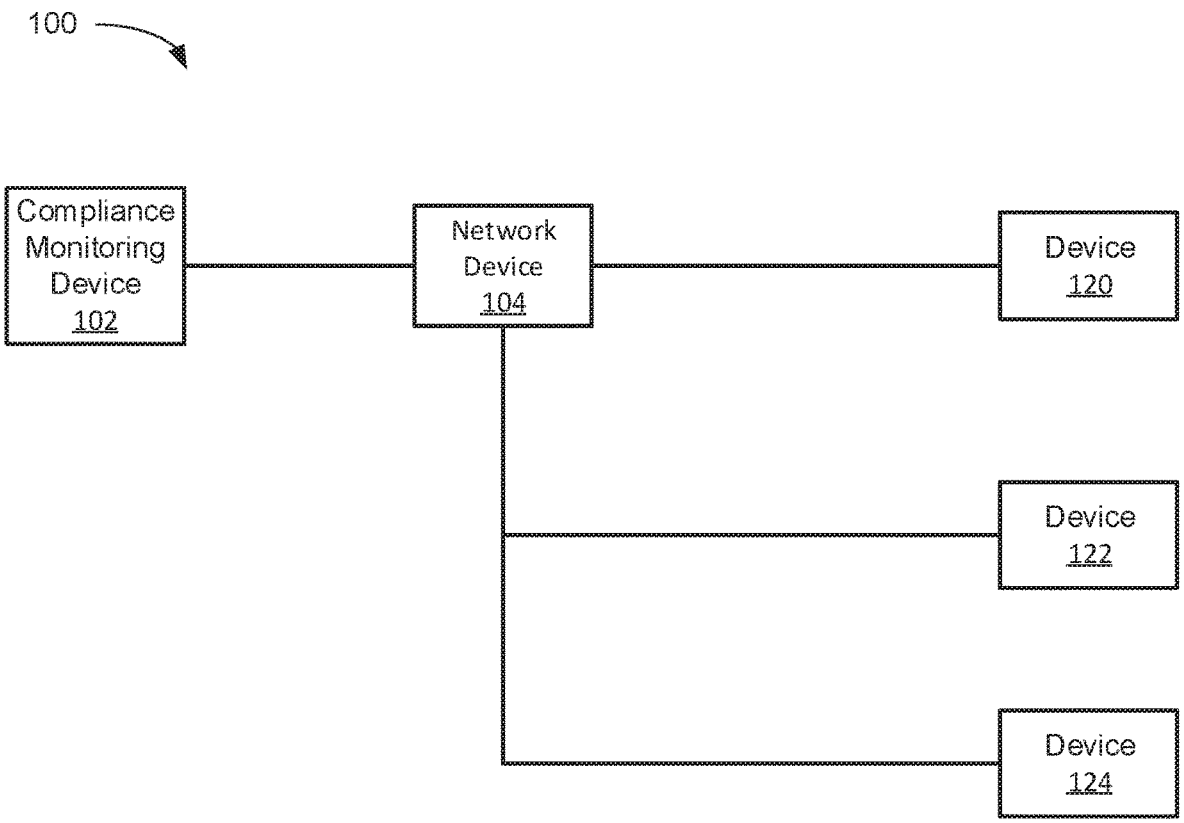
FIG. 1 depicts an illustrative communication network in accordance with one implementation of the present disclosure.

Aspects and implementations of the present disclosure are directed to device classification. The systems and methods disclosed can be employed with respect to network security, among other fields. More particularly, it can be appreciated that access to network resources by unauthorized devices is a significant and growing problem. At the same time, the proliferation of network-connected devices (e.g., smartphones, tablets, wearable devices, etc.) can make it difficult to effectively manage access to network resources for those users or devices that are authorized. Accordingly, described herein in various implementations are systems, methods, techniques, and related technologies, that enable the ongoing monitoring of network devices and activity and provide the ability to control access to network resources (e.g., by defining and employing access policies which dictate the types of devices that are or are not authorized to access certain network resources, the circumstances under which such access is or is not permitted, etc.).

In order to ensure compliant configurations of electronic devices or computing devices within a network, administrators typically try to ensure that computing devices are configured in particular ways. This has traditionally been done using "golden images" and manual configuration checks. The golden image may be a computing system image that has been customized to a particular configuration that may be copied onto multiple computing systems or devices.

Automated device compliance can be difficult to determine and to review with existing methodologies. Further, devices may fail to maintain compliance, e.g., when the devices are not kept up to date following intentional or unintentional user configuration changes. Typical compliance scanning requires individually identifying and entering an IP address of a device to be scanned for compliance as well as a schedule for when to scan the devices. This can present a significant burden to an information technology (IT) administrator.

Compliance checks and associated remediation may thus be automated to ensure that computing devices are compliant including in dynamic network environments. Automated compliance can be performed using a standard based compliance protocol, e.g., secure content automation protocol (SCAP). SCAP is a set of open standard XML based languages for writing configuration benchmarks for computing devices. SCAP can also be used to create a benchmark of vulnerabilities that devices should not contain.

Accordingly, described herein in various implementations are systems, methods, techniques, and related technologies, which combine standards based compliance with policy based network access control. As described herein, a device communicatively coupled to a network can be scanned using standard based compliance rules (e.g., SCAP rules) and a compliance level is computed. Based on the compliance level, a level of network access and one or more remediation or information actions may be performed. The compliance checks may be automated and performed periodically (e.g., at regular intervals of time, from time to time, or frequently) to ensure compliance is maintained.

Network access control and compliance monitoring may be done using the creation of policies which evaluate device compliance and based on the level of compliance, perform one or more control actions which grant (or deny) the device a defined (e.g., or predefined) level of access, and remediation actions which attempt to fix compliance issues on the device.

The policy may thus specify what devices are scanned for compliance and when the devices are scanned for compliance. Embodiments may thus automatically (e.g., without user intervention) select what devices will be scanned for compliance and when the devices will be scanned.

Solutions, e.g., including a network access control (NAC) solution, can be used to automate the determination of which devices to scan and when to scan the devices for compliance. This can include scanning a newly discovered device upon communicative coupling to a network. The solutions can further ensure compliance and remediation of any discovered instances of non-compliance.

The solutions can automatically determine (e.g., without user intervention, based on preconfigured policies, or a combination thereof) which compliance benchmarks apply to which devices and perform compliance checks according to compliance rules of the compliance benchmark. The results of a compliance scan can include identifiers for each rule, results for the rule, and the associated IP address. Action can be taken then based on the results for the set of rules including based on a weighting of the rules. For example, if a device passes only 75% of the rules, the device may be quarantined to a particular network or virtual local area network (VLAN) and optionally a message including information about the device may be sent to an IT administrator. The automatic nature of various aspects of the solutions allows for compliance monitoring and associated actions to be performed, as described herein, without user-intervention. The compliance monitoring and actions can be also performed real-time or within specified time constraints for particular conditions. For example, a device added to the network may be checked for compliance within a predetermined amount of time (e.g., 5 seconds).

The scanning of a device may be performed based on the detection of the device or readmission of the device (e.g., a computer being restated or being brought into an office for first time of the day) to a network or with a periodic frequency (e.g., a device may be scanned periodically according to a predetermined period of time such as 24 hours). The solutions disclosed herein, thus allow for automated and continuous compliance checks that previously were manual compliance checks applied to individual IP addresses. Automated and prompt remediation is also supported.

Using available standard based compliance content (e.g., open and closed source SCAP content) available, organizations can program a NAC solution to check device compliance using pre-written, authoritative, standardized rule-set, or a combination thereof in the form of standardized content (e.g., SCAP content). This allows the direct linking of compliance within a NAC product to the results of a compliance scan based on the content (e.g., SCAP content). Remediation can be attempted (e.g., automatically) for specific compliance failures and grant or denial of network access to a device can be based on the computed compliance level.

Advantageously, the use of standards based compliance content (e.g., SCAP content) is not dependent on or related to the particular NAC solution being used. Further, the compliance check can be defined technically (e.g., using XML) and therefore avoid misinterpretations or misconfigurations as can happen with a prose-based configuration checklist being input to a NAC based policy engine.

Embodiments can use information about the devices on a network, e.g., the IP address and active status, to automate compliance scanning of devices and further compliance scanning of particular devices. In order to effectively implement network access policies, it may be advantageous to identify, classify, or otherwise determine various aspects, features, or characteristics of devices that are connected to a network or what the devices are (or are not) doing on the network. For example, the compliance scans can be performed on selected devices communicatively coupled to a network that have been classified as having a particular operating system, e.g., Microsoft Windows™. Embodiments can thus remove the need for network administrators to have to manually specific IP addresses or IP address ranges for compliance scanning.

Accordingly, it can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a compliance monitoring device 102, a network device 104, and devices 120-124. The devices 120-124 and may be any of a variety of devices including, but not limited to, computing systems, laptops, smartphones, servers, Internet of Things (IoT) devices, etc. It is noted that the devices of communication network 100 may communicate in a variety of ways including wired and wireless connections and may use one or more of a variety of protocols.

Network device 104 may be one or more network devices configured to facilitate communication among compliance monitoring device 102 and devices 120-124. Network device 104 may be one or more network switches, access points, routers, firewalls, hubs, etc.

Compliance monitoring device 102 may be configured for a variety of tasks including performing compliance benchmarking or scanning of devices 120-124. Compliance monitoring device 102 may be a computing system, a network device (e.g., router, firewall, access point), a network access control (NAC) device, an intrusion prevention system (IPS), an intrusion detection system (IDS), a deception device, a cloud-based device, a virtual machine based system, etc. Compliance monitoring device 102 may communicate with different network devices and security products (not shown) (e.g., a vulnerability assessment (VA) system, a threat detection (TD) system, a mobile device management (MDM) system, a firewall (FW) system, a switch system, or an access point system) to access information that may be used for classification of devices coupled to network 100. Compliance monitoring device 102 may be communicatively coupled to the network device 104 in such a way as to receive network traffic flowing through the network device 104 (e.g., port mirroring).

Compliance monitoring device 102 is configured to access one or more policies which identify compliance rules (e.g., according to a standard such as SCAP) and associated actions based on the compliance benchmarks or levels that result from the compliance rules to be applied to particular devices. The compliance benchmark may be in an extensible configuration checklist description format (XCCDF) and include one or more SCAP rules, e.g., defined using the open vulnerability and assessment language (OVAL). The compliance rules may have weights associated therewith thereby enabling the calculating of a compliance score or level, e.g., as a percentage or a number of points. For example, one rule may be worth two points (e.g., whether the machine has an up to date word processor program) while another rule may be worth ten points (e.g., whether the machine has an up to date set of anti-virus definitions).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Compliance monitoring device 102 may initiate a compliance scan of a device upon the device being detected or communicatively coupled to a network. Compliance monitoring device 102 may further initiate compliance scans on a periodic basis or time since the last scan of a device (e.g., if it has been greater than 24 hours since the devices was scanned).

For example, upon the detection of device 120 being added to a network and being determined to be a Windows™ 7 device, several SCAP rules may be accessed according to a policy that applies to Windows™ 7 devices. Compliance scanning of the device can then be performed to determine a compliance level. For example, if the compliance level is 20% or below, then operating system updates may be initiated via an update management system on the network (not shown) to attempt to update the device and increase compliance. The device may then be rescanned and upon obtaining a compliance level of 80% or above, compliance monitoring device 102 may grant the device network access.

Figure 2:
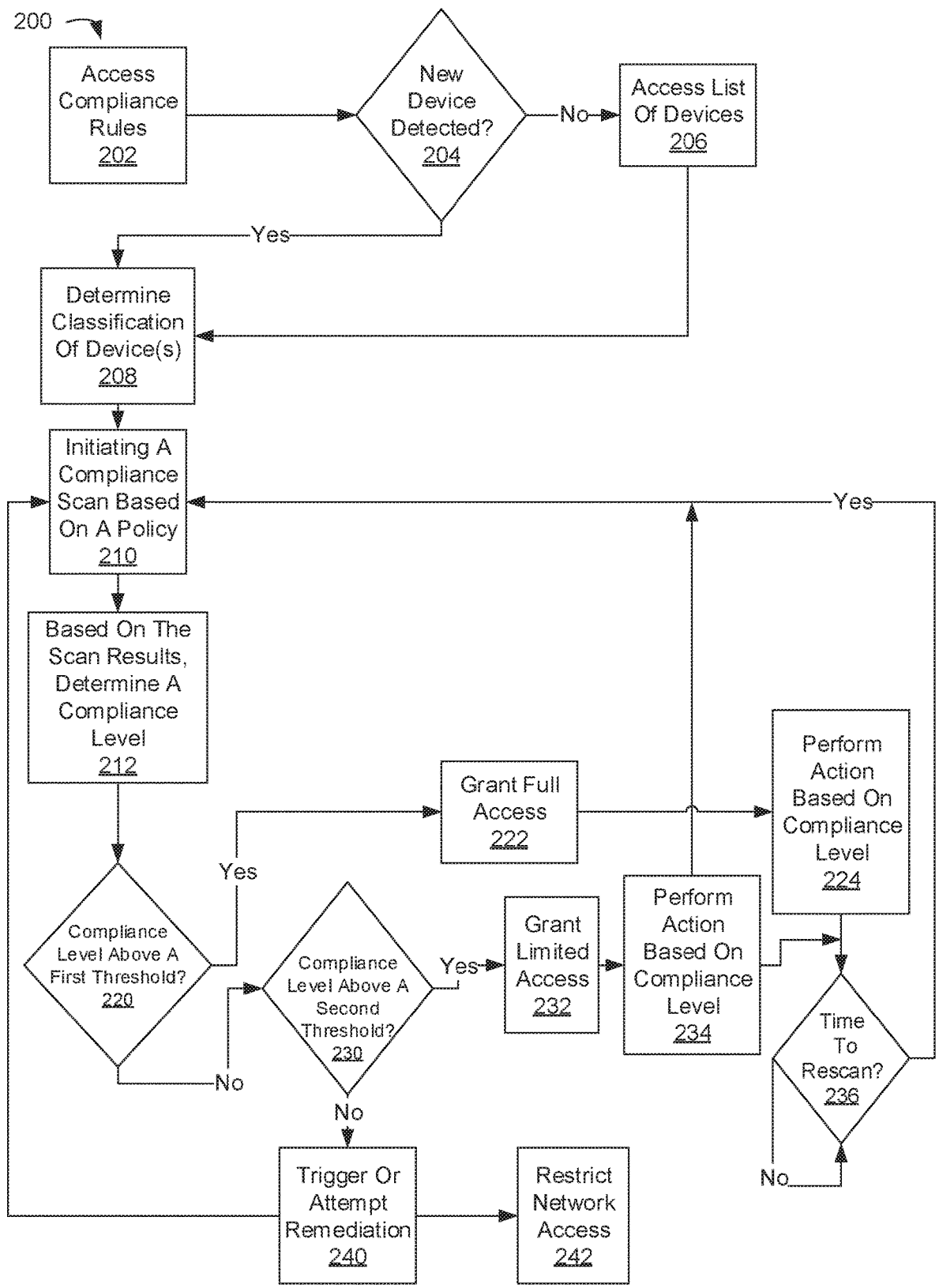
FIG. 2 depicts a flow diagram of aspects of a method for monitoring device compliance in accordance with one implementation of the present disclosure.

With reference to FIG. 2, flowchart 200 illustrates example functions used by various embodiments. Although specific function blocks ("blocks") are disclosed in flowchart 200, such steps are examples. That is, embodiments are well suited to performing various other blocks or variations of the blocks recited in flowchart 200. It is appreciated that the blocks in flowchart 200 may be performed in an order different than presented, and that not all of the blocks in flowchart 200 may be performed.

FIG. 2 depicts a flow diagram of aspects of a method for monitoring device compliance in accordance with one implementation of the present disclosure. The flow chart 200 of FIG. 2 may be performed by compliance monitoring device 102 or any system configured to monitor device compliance, initiate actions in response to compliance issues, or a combination thereof.

At block 202, compliance rules are accessed. The compliance rules may be according to a standard including open and closed standards and be accessed according to a policy, as described herein. The compliance rules may be SCAP rules. The compliance rules may be accessed from a storage or downloaded from a website or other network source. The compliance rules may be user customized. For example, a user could open a compliance rules file (e.g., with an extensible markup language (XML) editor) and remove one or more rules or modify one or more weights associated with the rules.

At block 204, whether a new device is detected is determined. The device may be detected as part of a periodic scan of the network (e.g., a scan of network 100 by compliance monitoring device 102) or the device may be detected upon being communicatively coupled to the network (e.g., being communicatively coupled to network device 104). The detecting of the device coupled to the network may include detecting the device in response to the device being recoupled or readmitted to the network. If a new device is detected block 208 is performed. If a new device is not detected, block 206 is performed.

At block 206, a list of devices is accessed. The list may be a list of devices (e.g., devices 120-124) coupled to a network (e.g., network 100). For example, the list may be maintained by a NAC device (e.g., compliance monitoring device 104).

At block 208, classifications of one or more devices is determined. The classification may be determined based on a variety of information including, but not limited to, the MAC address of the device, the user-agent string of the device, traffic information (e.g., IP address, ports or protocols being used, etc.), information from an agent, information from other systems (e.g., third party systems) or devices, etc. The third party system can be a vulnerability assessment (VA) system, a threat detection (TD) or advanced TD system, a mobile device management (MDM) system, a firewall (FW) system, a switch system, and an access point (AP) system.

The classifications may be stored and updated or rechecked periodically as more information about a device becomes available. The time for rechecking classification may be a configurable frequency or interval. For example, the interval could be set to a relatively long period of time for a network that is expected to be relatively stable with a small number, if any, of new devices being introduced.

At block 210, a compliance scan based on a policy is initiated. The scan may be based on a policy that has a portion (e.g., particular or a subset) of compliance rules that are to apply to one or more devices based on the classification of the devices. The scan may be triggered based on the policy.

At block 212, a compliance benchmark level is determined based on the scan results. The compliance level can be determined based on the result of the scan according to each rule (e.g., whether the device meets a condition of a rule) and a weight assigned to each rule (e.g., a certain number of points or a percentage assigned to each rule). Compliance with a particular rule can be weighted to reflect the critical nature or importance of complying with a particular rule. For example, a rule associated with having anti-virus updates that are no more than two days old or a rule associated with having a password that is at least ten characters long could be weighted to be associated with 50% or 50 points of the compliance level thereby making compliance with the rule critical for a passing compliance level (e.g., and allowing access to the network).

At block 220, whether the compliance level is above a first threshold is determined. For example, the first threshold may be 70 percent compliance, so a device with a compliance level that is 70 percent or above will be granted a relatively high level of network access while a device with a compliance level below the first threshold may be granted different network access, if any. If the compliance level is above the first threshold, block 222 is performed. If the compliance level is not above the first threshold, block 230 is performed.

At block 222, full or substantially full network access is granted. This level of network access may be granted to devices that have little (e.g., minor) or no compliance issues as determined from the compliance scan.

At block 224, one or more actions are optionally performed on the device based on the compliance level. The actions may include remediation actions, logging information, or information actions. The remediation action can include signaling a patching service or system (e.g., on the network or on the device), signaling an update service or system (e.g., on the network or on the device), changing the network access of a device (e.g., changing the VLAN), and sending a notification (e.g., an email or creating an information technology (IT) ticket). The logging information can include logging the compliance level and the results of the compliance scan for each rule. The information action can include sending an email based on the compliance results (e.g., for the compliance level being above the first threshold) or creating an IT ticket.

It is appreciated that the actions taken for devices having a compliance level greater than the first threshold may be more informational and less restrictive or less remedial in nature while informational actions and actions of a more restrictive or remedial nature (e.g., limited network access) may be taken for devices with a compliance level less than the first threshold. Informational actions and actions with an increased restrictive or remedial nature (e.g., denying network access) may be taken for the devices that have compliance levels below the second threshold.

At block 230, whether the compliance level is above a second threshold is determined. For example, the second threshold may be 50 percent compliance, so a device with a compliance level that is between 50 and 70 percent will be granted limited network access. It is appreciated that embodiments may support more or less thresholds or compliance levels than shown in flow chart 200. If the compliance level is above the second threshold, block 232 is performed. If the compliance level is not above the first threshold, block 240 is performed.

At block 232, limited network access is granted. The limited access may limit the device to accessing only particular sites, e.g., those of an anti-virus provider or malware update provider, in order to enable the device to obtain updates or patches to increase the compliance level of the device.

At block 234, one or more actions based on compliance are optionally performed. The actions may include the actions described herein (e.g., with respect to block 224). The actions may be further customized based on the compliance level. For example, multiple actions may be taken and the actions may be taken in order to remedy specific areas of lack of compliance. Block 236 may be performed after block 234.

The actions may be performed according to a security policy which specifies the compliance rules to be applied and the actions to be performed based on the compliance level. Security policy actions may be applied in real-time.

In some embodiments, a security policy may be created based on the classification of the device. For example, if the device classified is an industrial control system, a security policy may be configured according to a default security policy for industrial controls system which prevents the industrial control system from accessing the Internet.

At block 236, whether it is time to recheck compliance is determined. The time to recheck compliance may be based on a policy value, e.g., that devices are to be checked for compliance every 24 hours. The interval could also be set to a shorter period of time if the network is very dynamic and frequently has new devices being introduced or devices being reintroduced. The time for rechecking compliance may be triggered for based on a device being coupled to the network or a different part of the network. If it is time for a rechecking of compliance, block 210 is performed. If it is not time for a rechecking of compliance, block 236 is performed.

At block 240, remediation actions are triggered or attempted. The actions may include the actions described herein (e.g., described with respect to block 224). In some embodiments, the device that has a compliance level below the first and second thresholds is not granted network access or relatively restricted network access. Block 242 may be performed after one or more attempts at remediation have been performed.

At block 242, network access is restricted. The network access may be restricted to particular internal network resources (e.g., patch services, update services, or definitions services) or particular external resources. The network access may be relatively more restrictive than other levels of network access (e.g., the limited network access granted when the compliance is above the second threshold of block 232). This may be done for a device that has a compliance level below one or more thresholds and one or more remediation action attempts have been unsuccessful. One or more actions may performed, as described herein, including sending an email, creating an IT ticket, or other informational action to document the results of the compliance scans of the device and the unsuccessful remediation actions. This may be used to keep rogue or malicious devices from accessing a network or portions thereof. Network access may also be blocked.

Figure 3:
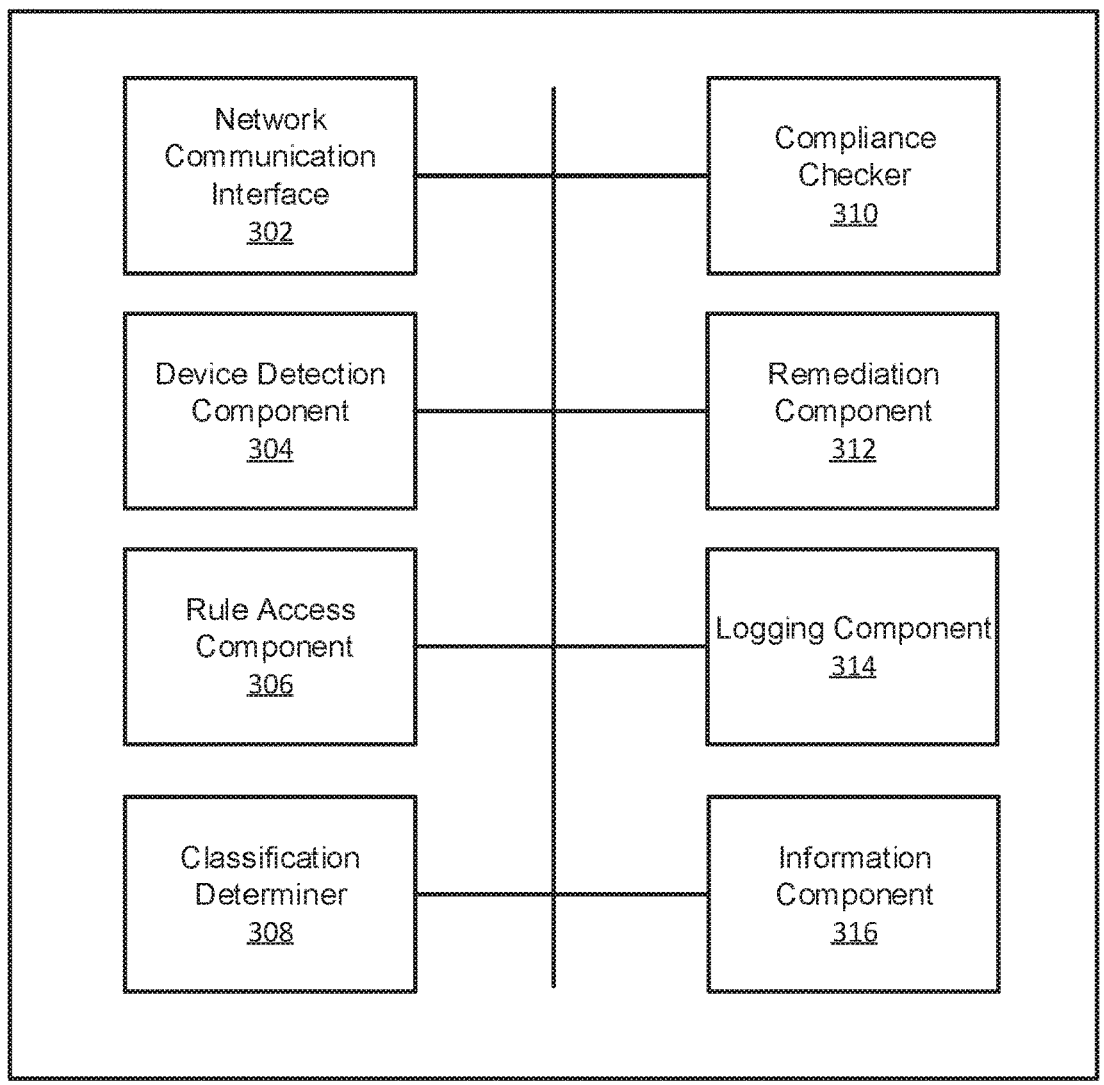
FIG. 3 depicts illustrative components of a system for compliance monitoring in accordance with one implementation of the present disclosure.

FIG. 3 illustrates example components used by various embodiments. Although specific components are disclosed in system 300, it should be appreciated that such components are examples. That is, embodiments of the present invention are well suited to having various other components or variations of the components recited in system 300. It is appreciated that the components in system 300 may operate with other components than those presented, and that not all of the components of system 300 may be required to achieve the goals of system 300.

FIG. 3 depicts illustrative components of a system for device classification in accordance with one implementation of the present disclosure. FIG. 3 shows an example system 300 including a network communication interface 302, a device detection component 304, a rule access component 306, a device classifier 308, a compliance checker component 310, a remediation component 312, a logging component 314, and an information component 316. The components of system 300 may be part of a computing system or other electronic device (e.g., compliance monitoring device 102) or a virtual machine and be configured to check compliance of one or more devices communicatively coupled to a network. For example, the system 300 may further include a memory and a processing device, operatively coupled to the memory, which may perform the functions of or execute the components of system 300. The components of system 300 may access various data associated with a device, compliance rules, compute a compliance level, and trigger actions based on the compliance level of the device. It is appreciated that the modular nature of system 300 may allow the components to be independent and allow flexibility to enable or disable individual components or to extent/upgrade components without affecting other components thereby providing scalability and extensibility.

Network communication interface 302 is configured to communicate with one or more devices (e.g., network device 104) coupled to a network that are coupled to system 300 and communicate devices on the network or receive or access network traffic, as described herein.

Device detection component 304 is configured to detect when a device is communicatively coupled to a network, powers on, or is readmitted to the network, as described herein. Device detection component 304 may signal other components (e.g., device classifier 308 or compliance checker 310) that a device is now communicatively coupled to a network.

Rule access component 306 is operable to access compliance rules (e.g., standard based compliance rules, like SCAP) for use in performing compliance checks, as described herein. The rules may be vendor independent thereby allowing one or more devices from different vendors to access and perform compliance checks.

Classification determiner 308 is configured to determine a classification of a device based on one or more information sources, as described herein. Classification determiner 308 may further store a device type classification of the device. Classification determiner 308 may be configured to determine the device type classification of the device periodically, as described herein.

Compliance checker 310 is operable to perform compliance checks, according to a policy, based on compliance rules (e.g., accessed by rule access component 306) of one or more devices based on a respective device classification (e.g., determined by classification determiner 308), as described herein. Compliance checker 310 can further determine a compliance level for each device based on the compliance rules. Compliance checker 310 can signal remediation component 312, logging component 314, and information component 316 to take appropriate action based on each compliance level, as described herein.

Remediation component 312 is operable for initiating or triggering one or more remediation actions, as described herein. Remediation component 312 may restrict network access, signal a patch system or service, signal an update system or service, or initiate an action to address one or more compliance issues, as described herein. The remediation component 312 may thus, among other things, automatically patch, automatically update, and automatically restrict network access of a device.

Logging component 314 is operable to log information about compliance checks including information of machines or devices that have passed compliance checks, attempted compliance checks that fail, and compliance levels computed as a result of compliance checks.

Information component 316 is operable for storing or sending information about or resulting from compliance checks, as described herein. For example, information component 316 may send an email notification about a compliance check result (e.g., below a compliance level threshold) or create an IT ticket.

The system 300 may be software stored on a non-transitory computer readable medium having instructions encoded thereon that, when executed by a processing device, cause the processing device to: determine a classification of a plurality of devices and access compliance data associated with the classification of the plurality of devices. The compliance data can include a plurality of compliance rules and a respective weight associated with each compliance rule and the plurality of compliance rules are based on a standard (e.g., SCAP).

The processing device is further to perform a respective compliance scan of each of the plurality of devices based on the plurality of compliance rules and determine a respective compliance level for each of the plurality of devices. The respective compliance level is determined based on the plurality of compliance rules and the respective weight associated with each compliance rule. The processing device is further to initiate an action based on the compliance level for each device of the plurality of devices.

The action can include logging information associated with a device of the plurality of devices and sending a notification associated with a device of the plurality of devices. In some embodiments, the processing device is further to compare the compliance level of a device with a first threshold and the action is further based on the comparison of the compliance level of the device with the first threshold. In various embodiments, the processing device is further to compare the compliance level of a device with a second threshold and the action can further be based on the comparison of the compliance level of the device with the second threshold. In some embodiments, the processing device is further to modify a weight associated with one of the compliance rules (e.g., a modification of a weight initiated by a user).

Figure 4:
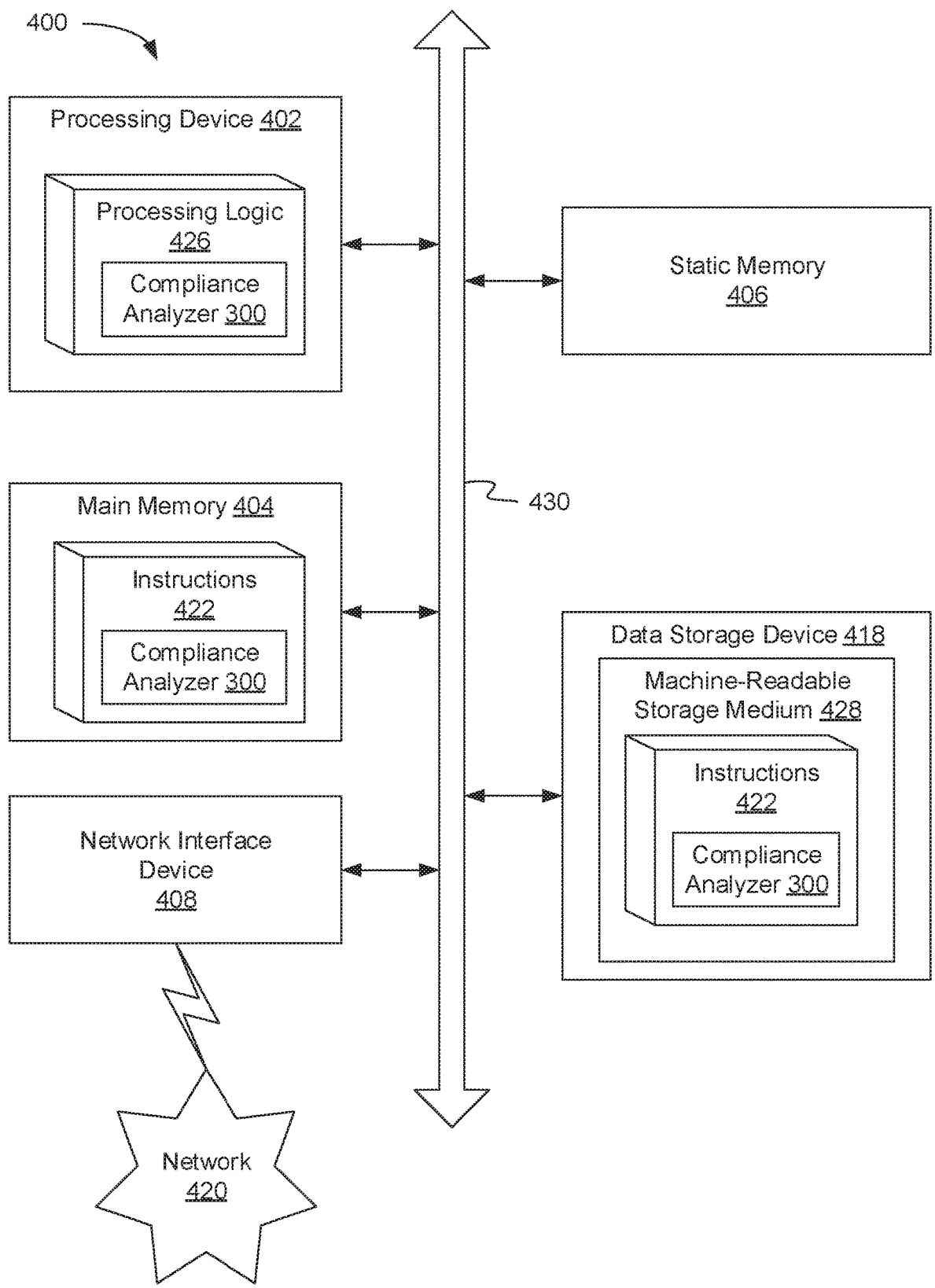
FIG. 4 is a block diagram illustrating an example computer system, in accordance with one implementation of the present disclosure.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 400 may be representative of a server, such as compliance monitoring device 102 configured to perform compliance monitoring or the functions of system 300.

The exemplary computer system 400 includes a processing device 402, a main memory 404 (e.g., read-only memory (ROM), flash memory, dynamic random access memory (DRAM), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute processing logic 426, which may be one example of system 300 shown in FIG. 3, for performing the operations and steps discussed herein.

The data storage device 418 may include a machine-readable storage medium 428, on which is stored one or more set of instructions 422 (e.g., software) embodying any one or more of the methodologies of functions described herein, including instructions to cause the processing device 402 to execute compliance analyzer 300. The instructions 422 may also reside, completely or at least partially, within the main memory 404 or within the processing device 402 during execution thereof by the computer system 400; the main memory 404 and the processing device 402 also constituting machine-readable storage media. The instructions 422 may further be transmitted or received over a network 420 via the network interface device 408.

The machine-readable storage medium 428 may also be used to store instructions to perform a method for compliance monitoring, as described herein. While the machine-readable storage medium 428 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   detecting, by a compliance monitoring device, a device coupled to a network in response to the device being coupled to the network;
   determining a classification of the device based on traffic information associated with the device;
   accessing a compliance rule based on the classification of the device, wherein the compliance rule is a standard based compliance rule;
   performing, by a processing device of the compliance monitoring device, a compliance scan on the device based on the compliance rule;
   determining a compliance level of the device based on a result of the compliance scan of the device; and
   performing an action based on the compliance level.

2. The method of claim 1, wherein the compliance rule is a compliance standard based compliance rule.

3. The method of claim 1, wherein the compliance rule is a security content automation protocol (SCAP) rule.

4. The method of claim 1, wherein the compliance rule and the action are associated with a security policy.

5. The method of claim 4 further comprising:
   performing another compliance scan of the device based on the security policy.

6. The method of claim 1, wherein the action comprises changing network access of the device.

7. The method of claim 1, wherein the compliance scan of the device is performed automatically according to a security policy.

8. The method of claim 1, wherein the compliance rule is associated with a weight and the compliance level is based on the weight.

9. The method of claim 1, wherein the action comprises automatically initiating an update service associated with the device.

10. The method of claim 1, wherein the action comprises initiating a patch service associated with the device.

11. The method of claim 1, wherein the traffic information comprises at least one of an IP address, a port, or a protocol being used by the device.

12. A system comprising:
    a memory; and
    a processing device, operatively coupled to the memory, to:

determine a classification of a plurality of devices based on at least one of a MAC address of the device or traffic information associated with each of the plurality of devices;

access compliance data associated with the classification of the plurality of devices, wherein the compliance data comprises a plurality of compliance rules and a respective weight associated with each compliance rule and wherein the plurality of compliance rules are based on a standard;

modify, by the processing device, one of the respective weights associated with one of the compliance rules;

perform a respective compliance scan of each of the plurality of devices based on the plurality of compliance rules;

determine a respective compliance level for each of the plurality of devices, wherein the respective compliance level is determined based on the plurality of compliance rules and the modified respective weight associated with each compliance rule; and initiate an action based on the compliance level for each device of the plurality of devices.

13. The system of claim 12, wherein the action comprises logging information associated with a device of the plurality of devices.

14. The system of claim 12, wherein the action comprises sending a notification associated with a device of the plurality of devices.

15. The system of claim 12, wherein the processing device is further to compare the compliance level of a device with a first threshold and the action is further based on the comparison of the compliance level of the device with the first threshold.

16. The system of claim 15, wherein the processing device is further to compare the compliance level of a device with a second threshold and the action is further based on the comparison of the compliance level of the device with the second threshold.

17. A non-transitory computer readable medium having instructions encoded thereon that, when executed by a processing device of a compliance monitoring device, cause the processing device to:

detect, by the processing device of the compliance monitoring device, a device being coupled to a network;

determine a classification of the device based on traffic information associated with the device;

access a plurality of compliance rules associated with the classification of the device, wherein the plurality of compliance rules are associated with a standard;

determine a compliance level of the device based on the plurality of compliance rules, wherein the compliance level is based on a respective weight associated with each of the plurality of compliance rules;

compare, by the processing device of the compliance monitoring device, the compliance level to a threshold;

initiate a first action based on the compliance level being above the threshold; and initiate a second action based on the compliance level being below the threshold.

18. The non-transitory computer readable medium of claim 17, wherein the compliance scan of the device is performed automatically and periodically.

* * * * *